(12) United States Patent
Ponce de Leon

(10) Patent No.: US 8,543,978 B2
(45) Date of Patent: Sep. 24, 2013

(54) SYSTEMS AND METHODS FOR CREATING SOFTWARE

(76) Inventor: Michael A. Ponce de Leon, San Antonio Heights, CA (US)

( * ) Notice: Subject to any disclaimer, the term of this patent is extended or adjusted under 35 U.S.C. 154(b) by 1502 days.

(21) Appl. No.: 11/870,905

(22) Filed: Oct. 11, 2007

(65) Prior Publication Data

US 2008/0256515 A1 Oct. 16, 2008

Related U.S. Application Data

(60) Provisional application No. 60/851,186, filed on Oct. 11, 2006.

(51) Int. Cl.
*G06F 9/44* (2006.01)

(52) U.S. Cl.
USPC ............................ 717/120; 717/107; 717/112

(58) Field of Classification Search
USPC .................................................. 717/100–123
See application file for complete search history.

(56) References Cited

U.S. PATENT DOCUMENTS

| | | | | |
|---|---|---|---|---|
| 6,083,276 | A * | 7/2000 | Davidson et al. | 717/107 |
| 6,370,681 | B1 * | 4/2002 | Dellarocas et al. | 717/110 |
| 6,654,953 | B1 * | 11/2003 | Beaumont et al. | 717/158 |
| 7,047,518 | B2 * | 5/2006 | Little et al. | 717/108 |
| 7,127,700 | B2 * | 10/2006 | Large | 717/100 |
| 7,519,969 | B2 * | 4/2009 | Bent et al. | 719/315 |
| 2002/0023261 | A1 * | 2/2002 | Goodwin et al. | 717/146 |
| 2004/0187090 | A1 * | 9/2004 | Meacham | 717/103 |
| 2005/0132343 | A1 * | 6/2005 | Bender | 717/145 |

OTHER PUBLICATIONS

B. Korel, Automated Software Test Data Generation, Aug. 1990 (vol. 16 No. 8), pp. 870-879.*
Meijler et al., Beyond objects: components, 1997—Citeseer, pp. 1-26.*
Wasserman et al., A graphical, extensible integrated environment for software development, ACM New York, NY, USA © 1987, vol. 22 Issue 1; pp. 131-142.*

* cited by examiner

*Primary Examiner* — Wei Zhen
*Assistant Examiner* — Satish Rampuria
(74) *Attorney, Agent, or Firm* — Fish & Associates, PC

(57) ABSTRACT

Software generates interfaces and functionality for an application program. At least a portion of an application is created by given names to data elements according to a syntax. Data tables are generated having fields that correspond to the elements and characteristics are associated with the fields specifying how the data in the fields interact with each other. Relationships among the elements are inferred as a function of their names. A functional interface can be generated from the inferred relationship.

13 Claims, 1 Drawing Sheet

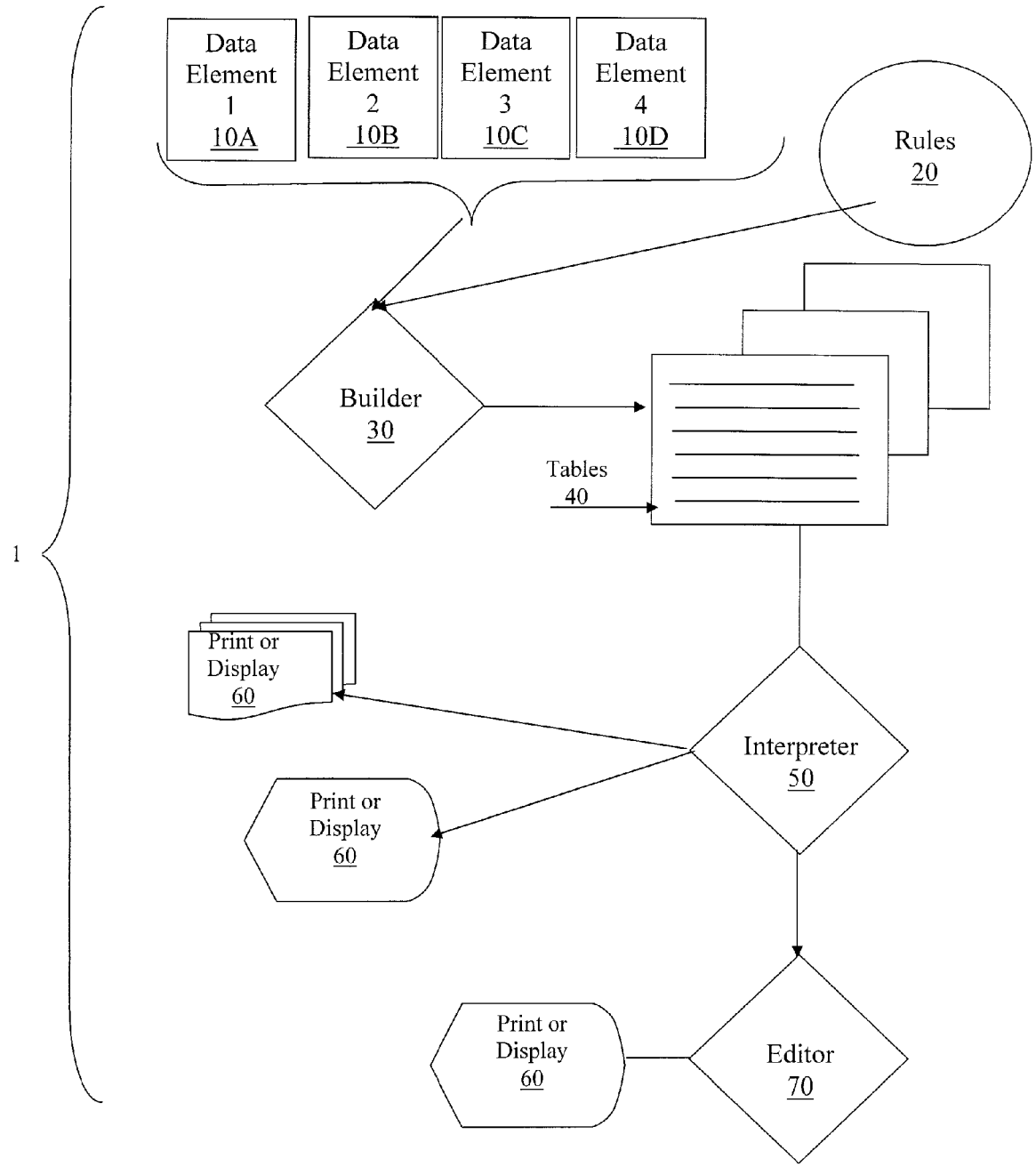

SYSTEMS AND METHODS FOR CREATING SOFTWARE

This application claims priority to U.S. Provisional Application No. 60/851,186 filed Oct. 11, 2006 which is herein incorporated by reference.

FIELD OF THE INVENTION

The field of the invention is authoring, generating, producing, and editing in information processing applications [class 707].

BACKGROUND

Order entry, inventory and other business oriented software applications can take several man years to create. The difficulty lies not so much in the complexity of the data, but in preparing the dozens or even hundreds of user interfaces required. this is the case regardless of whether the user interfaces predominantly interactive screens or non-interactive print reports.

Custom applications suffer from yet another problem related to personnel. Systems designers and programmers that created a system are rarely available down the road. They may have quit, or fallen ill, or even forgotten many of the details. All of those situations create an enormous burden on others down the road.

Some of the problems have been addressed through extensive reuse of generalized modules, and enforcement of a consistent naming syntax. See, for example, the ISO 11179 standard for naming data elements, which along with all other extrinsic material discussed herein is incorporated by reference in its entirety.

There is also a movement towards database normalization, for example, in which every non-key column in every table is directly dependent on the key, the whole key and nothing but the key. Such practice is said to produce reduced redundancies, fewer anomalies, and improved efficiencies.

It has also been suggested that programmers could use a combination of data element naming standards and intelligent agents to assist with data integration. But at the current stage of development, those strategies are inadequate to actually build an application.

Thus, there is still a need for systems, methods, strategies, programs and the like that use software to generate interfaces and functionality of an application.

SUMMARY OF THE INVENTION

The present inventive subject matter is directed toward systems, methods, strategies, and programs that use software to generate interfaces and functionality of the application. At least a portion of an application is created by given names to elements according to a syntax. Using software, a data table is generated having fields that correspond to the elements. Using a database language, associate a characteristics with the fields to specify how data in the fields interact with each other. The software infers a relationship between the elements as a function of their names where the relation any of the following types of relationships one-to-many, parent-child, or peer-to-peer. The software also can use the relationship information to generate an interface.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWING

FIG. 1 represents a logical overview a example system that generates an interface from data elements and rules.

DETAILED DESCRIPTION

Building an Interface

FIG. 1 represents a logical overview a example system that generates an interface from data elements and rules. In FIG. 1, a system 1 generally includes a plurality of data elements (of which only four exemplary elements are shown here, 10A-10D), a set of rules 20, a builder 30 that stores sets of characteristics in one or more tables 40, an interpreter 50, a user display or print device 60, and an interface editor 70.

Data elements 10A-10D are encoded with a suitable syntax that identifies relationships among the elements. In this particular example, data element 10A is Customer.No, element 10B is Order.No, element 10C is Order.Date, element 10D is Order.LineItemNo(M). One can readily infer from the naming syntax shows that there is a table of customers, of which Customer.No is a field. Similarly, there is also orders table in which each order has a single order number (Order.No), a single date (Order.Date), and a plurality of line items with at least a line item number (Order.LineItemNo(M)). The syntax can advantageously comprise a hierarchy as shown in this example, and can use a single character or other common separator. Of course, data elements can be used to store text, video or audio files, or any other storable information or objects.

The builder 30 derives relationships from the naming of the data elements, and applies the rules 20 to the relationships to develop permutations of sets of the characteristics to be used in creating interfaces. The relationships preferably include one-to-one and one-to-many, parent-child, grandparent-child, peer-peer and so forth. Any useful of characteristics can be included in the set, including for example, names of data elements or names that are logically related to the data element names. One can also advantageously include implementations of the rules such as: relative sequencing and/or framing or other positioning of the data elements in a display; logical associations such as element (A required when element B is present, or displaying B only where A exists or has a given value); displaying data elements in drop-down, combo or other choices boxes; restrictions on range, listed or other values of data elements; input or output formats and restrictions on same; security features, display and use of functionality buttons, and so forth.

Of course the builder could actually comprise multiple routines, which might be compiled and operate as a whole or as separate routines, stored procedures, etc. Additionally, the builder may overlap or share common resources with the interpreter, editor, or any of the other software.

There may well be hundreds of thousands of such permutations, but at the very least it is contemplated that the builder 30 will create numerous sets, preferably 1,000, and more preferably 10,000 such sets. The idea is that that there are only a finite number of permutations of the relevant combinations of the different data elements, and that by generating characteristics for many thousands of such combinations, one can answer just about any question, and provide just about any interface that a user could reasonably want. Yes, it is true that the builder will generate a great many sets that will never be utilized. But storage of these sets as records in one or more tables is so efficient that the benefits from automated production of the useful sets far outweighs the cost of producing and storing sets that are not useful.

Such sets can be stored in any suitable fashion, but for efficient access by the interpreter, the sets are preferably stored in one or more tables. In a currently preferred embodiment, there are 21 such tables, as follows:

Form
FormField
FormFieldCalculation
FormFieldDataSecurity
FormFieldDataValidation
FormFieldLanguage
FormFieldMap
FormFieldSecurity
FormFieldLink
FormFieldLanguage
FormFieldMemo
FormFieldModeButton
FormFieldModeButtonSecurity
FormFieldReport
FormFieldReportData
FormFieldReportStyle
FormFieldReportSecurity
FormFieldSuperlink
FormFieldTable
FormFieldType
Function When needed, the interpreter 50 selects records from the tables, and interprets the corresponding characteristics to produce an interface (display or print) at the user's end, for example at the display or print device 60.

The reader will immediately appreciate that different users have different preferences for colors, orientations, crowdedness of the screens, level of granularity of information, and so forth, and that the initial production of the sets of characteristics by the builder 30 will almost never satisfy all, or even most of those preferences. But by storing the characteristics of the interfaces in the various characteristics tables 40, and then producing new interfaces on the fly whenever needed by interpreting the characteristics, such preferences can be readily accommodated. In particular, interface editor 70 can be used to edit preferences on one or any subset of the sets of characteristics.

Application Generation

Claim set B addresses additional aspects of the systems and methods described above, including for example, that one could generate an entire application—essentially as a function of naming syntax and rules. In the creation of many applications the rules will be business rules. One rule, for example, might be that name, address line 1, address line 2, city, state, zip and country all go together, and in that particular sequence. Another rule might be that country is displayed only if it is not the United States.

Still other rules could be used to fine-tune at least one of the interfaces. A rule in this category might be to show prompt fields in yellow, and data fields in blue.

Naming syntax is currently contemplated to be an extremely powerful method of establishing relationships between and among various data elements. In that case, and suitable program, including the builder 30, could be used to discover at least some of the relationships. It is especially contemplated that discovered relationships can be used to facilitate creation of stored characteristics, or any other instructions used in the application, and that the characteristics or other information can then be stored in tables 40.

Database Languages and Extensions

Current database languages allow users to name fields, and to attach various attributes to those fields, usually length and data type. Interestingly, however, the current database languages do not allow users to attach attributes that describe how one field interacts with another field. That information is stored, not with the data fields, but with the interfaces.

One very powerful feature contemplated herein is use of a database language in a manner that allows users to attach attributes to fields that describe how one field interacts with another field. This could readily be accomplished as an extension to currently languages such as Structured Query Language (SQL). Preferred attributes include: a default order in which the first and second fields appear in an interface; specification of a number relationship such as a one-to-one relationship and a one-to-many relationship; specification of a familial relationship such as a parent-child relationship and a peer-to-peer relationship; specification of existence relationship, such that second data is to be obtained when first data is present; specification of a validity relationship such as second data being deemed valid only when first data is present; specification of an option relationship such as second data is to be obtained only when first data is or is not present; specification of a parameter-value relationship such as where the first data identifies a parameter and the second data identifies a value corresponding to the parameter; specification of a units relationship such as where the second data identifies units that apply to the first data; specification of a security relationship such as where the first data identifies a security protocol to be applied to the second data; specification of a key relationship such as where the first data identifies a key to be applied to the second data; specification of a link relationship such as where the first data is passed to a link provided by the second data; specification of a calculated relationship such as where the first data contains a formula for calculating a result that uses the second data; specification of a results relationship such as where the first data contains a result derived from a calculation using the second data; and specification of a metadata relationship such as where the first data contains metadata with respect to the second data. With respect to the metadata relationship, the second data can comprise at least one of an image and a sound clip, and the metadata can comprise, for example, a title.

Assisted Application Development

With respect to the fourth set of claims, it is contemplated that a computer implemented method of facilitating creation of at least a portion of an application can comprise: giving names to first and second elements according to a syntax; using a first software to generate a data table having first and second fields that correspond to the first and second elements, respectively; and using a database language to associate the first field with a characteristic that specifies how data associated with the first field interacts with data associated the second field.

The first software can advantageously infer a relationship between the first and second elements from the respective names, and can generate the table at least in part according to the relationship. As discussed above, the term "software" should be interpreted as a single, or more likely a number of different programs.

Regardless of the relationship, whether a one-to-one relationship, a one-to-many relationship, a parent-child relationship, a peer-to-peer relationship, or any other relationship, it is contemplated that the software can generate an interface having a structural feature that corresponds to the relationship. Generation of that interface can occur directly, or indirectly by establishing a set of characteristics and then using an interpreter to create the interface from the characteristics. In generating the interfaces (directly or indirectly), the software can include a feature that corresponds to the relationship, the rules, or both.

Of particular interest is where one of the rules comprises a numeric limit or a selection list. Also of particular interest is where the table (such as tables 40) stores the characteristic as an attribute of the first field. In all of this, it should be apparent to those skilled in the art that the inventive concepts can be applied to any realistic number of data elements.

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer implemented method of facilitating creation of at least a portion of a software application from first and second names, the method comprising:
    implementing a first software on a computer that automatically derives a relationship between first and second data elements according to a naming convention applied to the first and second names, wherein the naming convention uses an industry syntax;
    implementing a second software that automatically produces code underlying an interface having first and second data entry fields corresponding to the first and second data elements, respectively, wherein the relationship directs a characteristic that specifies how data associated with the first field interacts with data associated the second field with respect to a database language;
    using the first software to infer a second relationship between the second data element a third data element from the name of the second data element and a name of the third data element;
    using the second software to generate additional interfaces based at least in part upon permutations of including the first, second, and third fields; and
    interacting with a human user through an interface editor to edit preferences with respect to the characteristic.

2. The method of claim 1, wherein the first software uses the relationship to generate a data table having first and second fields that correspond to the first and second elements, respectively.

3. The method of claim 2, wherein the table stores the characteristic as an attribute of the first field.

4. The method of claim 2, further comprising using the first software to infer a third relationship between the third data element and a fourth data element from the name of the first third data element and a name of the third data element.

5. The method of claim 1, wherein the relationship is selected from the group consisting of a one-to-one relationship and a one-to-many relationship.

6. The method of claim 1, wherein the relationship is selected from the group consisting of a parent-child relationship and a peer-to-peer relationship.

7. The method of claim 1, further comprising using the second software to generate within the interface with a structural feature that corresponds to the relationship.

8. The method of claim 1, further comprising using the second software to generate within the interface a functional feature that corresponds to the relationship.

9. The method of claim 1, further comprising using a second software to generate within the interface a first feature derived from the relationship, and a second feature derived from a set of rules.

10. The method of claim 9, wherein a first one of the rules comprises a numeric limit.

11. The method of claim 9, wherein a first one of the rules comprises a selection list.

12. The method of claim 1, further comprising including in the table a third field that corresponds to the third data element.

13. The method of claim 1, further comprising using the first software to include in a second table a third field that corresponds to the third element.

\* \* \* \* \*